(12) United States Patent
Phillips (10) Patent No.: US 6,920,449 B2
(45) Date of Patent: Jul. 19, 2005

(54) BEAN GENERATED SQL FOR BACK-END MANAGEMENT AND CONFIGURATION

(75) Inventor: Brent Russel Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 10/165,129

(22) Filed: Jun. 6, 2002

(65) Prior Publication Data

US 2003/0229633 A1 Dec. 11, 2003

(51) Int. Cl.[7] .......................... G06F 17/30; G06F 15/00; G06F 9/44
(52) U.S. Cl. .............................. 707/3; 707/4; 715/513; 717/100
(58) Field of Search .............................. 707/1–3, 103; 709/200–203; 717/100, 114, 120

(56) References Cited

U.S. PATENT DOCUMENTS

| 5,584,024 | A | | 12/1996 | Shwartz |
| 5,812,840 | A | | 9/1998 | Shwartz |
| 6,216,139 | B1 | | 4/2001 | Listou |
| 6,237,135 | B1 | | 5/2001 | Timbol |
| 2003/0182307 | A1 | * | 9/2003 | Chen et al. ............. 707/103 X |
| 2003/0195997 | A1 | * | 10/2003 | Ibert et al. .................. 709/318 |
| 2003/0197733 | A1 | * | 10/2003 | Beauchamp et al. ........ 345/764 |

* cited by examiner

*Primary Examiner*—Alford W. Kindred
(74) *Attorney, Agent, or Firm*—David A. Mims, Jr.; Rudolf O. Siegesmund (57) ABSTRACT

A Configuration Application running on a server that responds to a web client is disclosed. The Configuration Application has a Bean Configuration Utility, a Program Bean and one or more SectionBeans within the Program Bean. The Configuration Application has a graphical user interface for the user to select tables, join tables, select columns, review a conditional SQL statement at the graphical user interface, and save the SQL statement. Using the graphical user interface, the user at the client computer can manipulate the Program Bean to return custom fields from the database without a change to the running application itself. The Program Bean is serializable and can be saved to a file, database, or it can be sent through a network socket (TCP/IP).

20 Claims, 9 Drawing Sheets

BEAN GENERATED SQL FOR BACK-END MANAGEMENT AND CONFIGURATION

FIELD OF THE INVENTION

The present invention relates to a web-based application for developing structured query language to configure a relational data base without changing the source code and while the web-based application is running.

BACKGROUND OF THE INVENTION

A relational database stores information in tables consisting of rows and columns of data. When an application requests information from a relational database, the relational data base matches information from a field in one table with information in a corresponding field of another table to produce a third table that combines requested data from both tables. A problem arises when it is desired to make a change in a running web based application searching a relational data base. In order to make a change, the application searching the relational data base must be stopped so that the application property files can be accessed and structured query language (SQL) code written. What is needed is a way to reconfigure the running application without stopping it.

SUMMARY OF THE INVENTION

The invention which meets the needs identified above is a Configuration Application running on a server that responds to a web client. The Configuration Application has a Bean Configuration Utility, a Program Bean and one or more SectionBeans within the Program Bean. The Configuration Application has a graphical user interface for the user to select tables, join tables, select columns, review a conditional SQL statement at the graphical user interface, and save the SQL statement. The SQL statement is generated by the Bean Configuration Utility and the Program Bean. The SectionBean stores components needed to create a valid SQL statement. The components stored in the SectionBean includes without limitation columns, tables, filters, and table joining information. The SectionBean contains methods to generate the statement using stored components in the SectionBean. The Bean stores one or more SectionBeans. The Program Bean contains methods to get a SectionBean and to call that SectionBean's generate SQL method to return a valid SQL statement to the calling program. The Bean Configuration Utility is a program application that is used to create new SectionBeans or to configure existing SectionBeans. The Bean Configuration Utility can configure a SectionBean running on a server or configure and save a SectionBean that is stored to the file system. The Configuration Application, running on a server, loads the Program Bean and uses the Program Bean to process requests coming from web clients. The Configuration Application is programmed to read the information stored in the bean to generate SQL statements, and thus avoids hard coding SQL statements in the code or in a property file. Configuration to the Program Bean is made only by the Bean Configuration Utility. Using the graphical user interface, the user at the client computer can manipulate tho Program Bean to return custom fields from the database without a change to the running application itself. The Program Bean is serialized and can be saved to a file, database, or it can be sent through a network socket (TCP/IP).

DETAILED DESCRIPTION OF THE PREFERRED EMBODIMENT

As used herein, the term "back end storage" means a relational data base accessed by a server computer and that contains the data for a particular web-based application.

As used herein, the term "bean" means a reusable independent code segment of an application according to Java component architecture defined by Sun Microsystems.

As used herein, the term "section bean" means a bean that has been configured for a specific data request. Multiple section beans can be contained in a "program bean." For example, one section bean will contain one section of data for one program and another section bean will contain another section of data for another program As used herein, the term "program bean" means a bean containing one or more section beans for storing information on the database columns and conditions.

As used herein, the term "serialize" means saving a bean object's instance variables which define the bean's current state and saving the bean's current state as a sequence of bytes that can be sent over a network or saved to a file. As used herein the term "serialized bean" means a serialized bean object that can be saved to a file, sent to a data base, or e-mailed.

Figure 1:
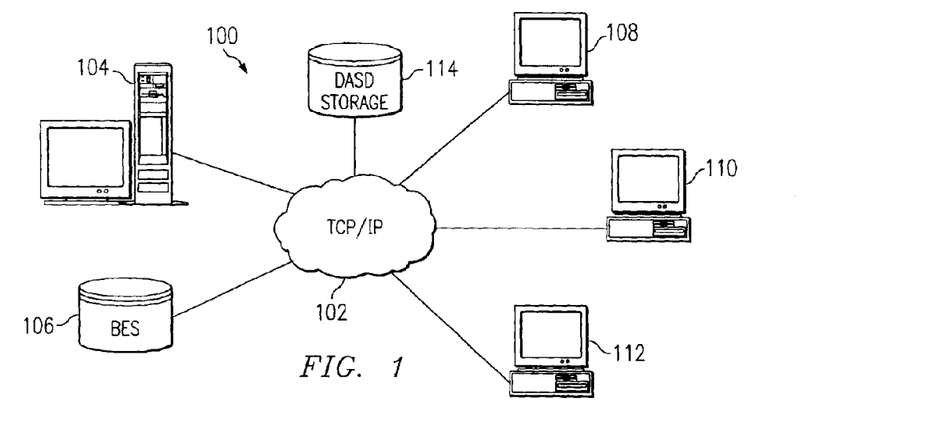
FIG. 1 depicts a distributed data processing system in which the invention may be implemented.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with back end storage unit 106 and Direct Access Storage Device (DASD) 114. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
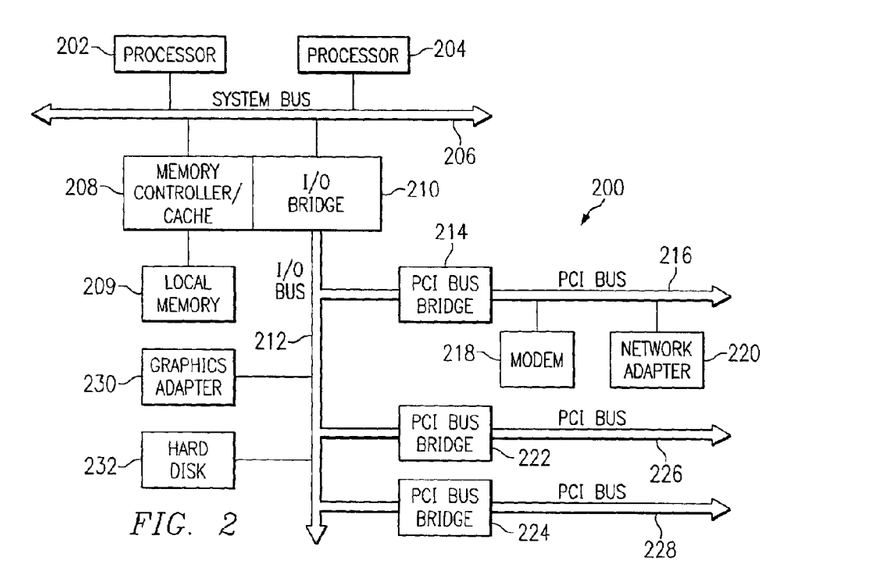
FIG. 2 depicts a server computer in which the software to implement the server portion of the invention may be stored.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI local bus 216. Typical PCI bus implementations will support four PCI expansion slots or add-in connectors. Communications links to clients 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
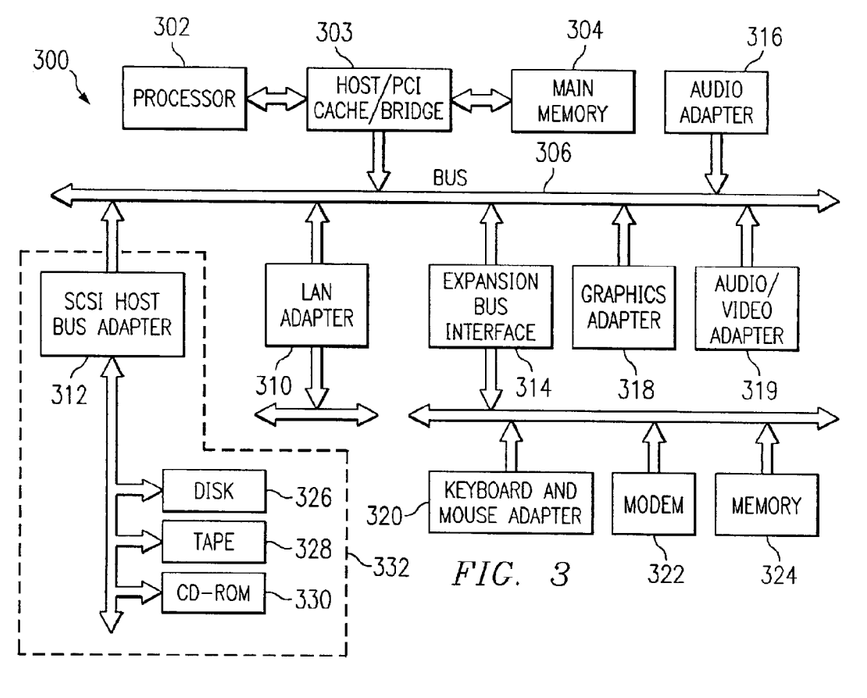
FIG. 3 depicts a computer in which the software to implement the user portion of the invention may be stored.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or student-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 4:
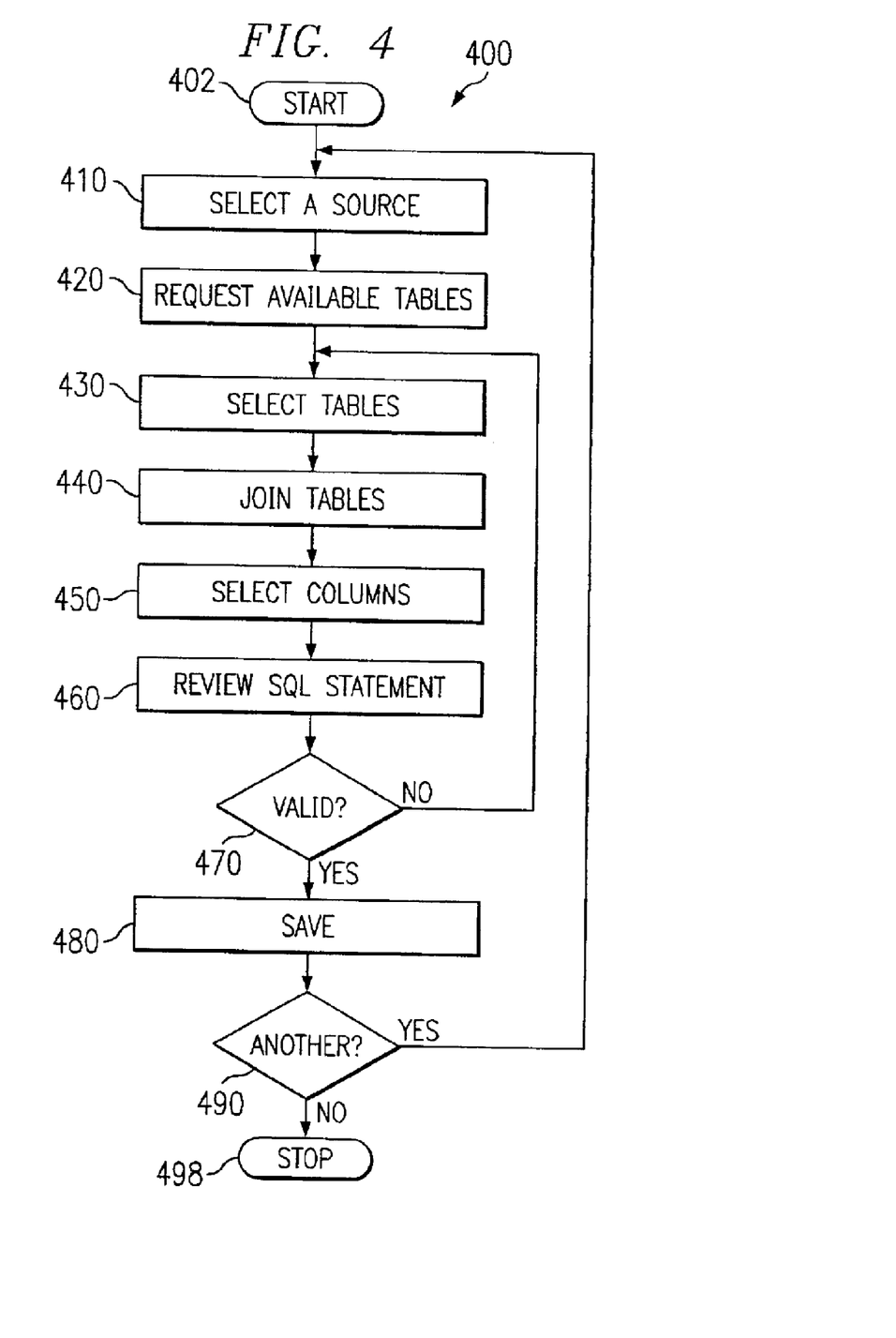
FIG. 4 is a flowchart of the user program.

FIG. 4 is a flow chart of user actions 400 at the client computer. User action process 400 begins (402) and the user selcets a source (410). Using the graphical user interface (See FIGS. 5–7) the user requests available tables (420). The user selects tabels (430). The user joins the selected tables (440). The user then selects columns from the joined tables (450). The user reviews the SQL statement (460). The user determines whether the SQL statement is valid (470). If the SQL statement is not valid, user goes to step 430. If the SQL statement is valid, the user then saves the new SQL statement (480). If the user wants to configure another application, then the user goes to step 410. If the user does not want to configure another application, then user action process 400 ends. (498).

Figure 5A:
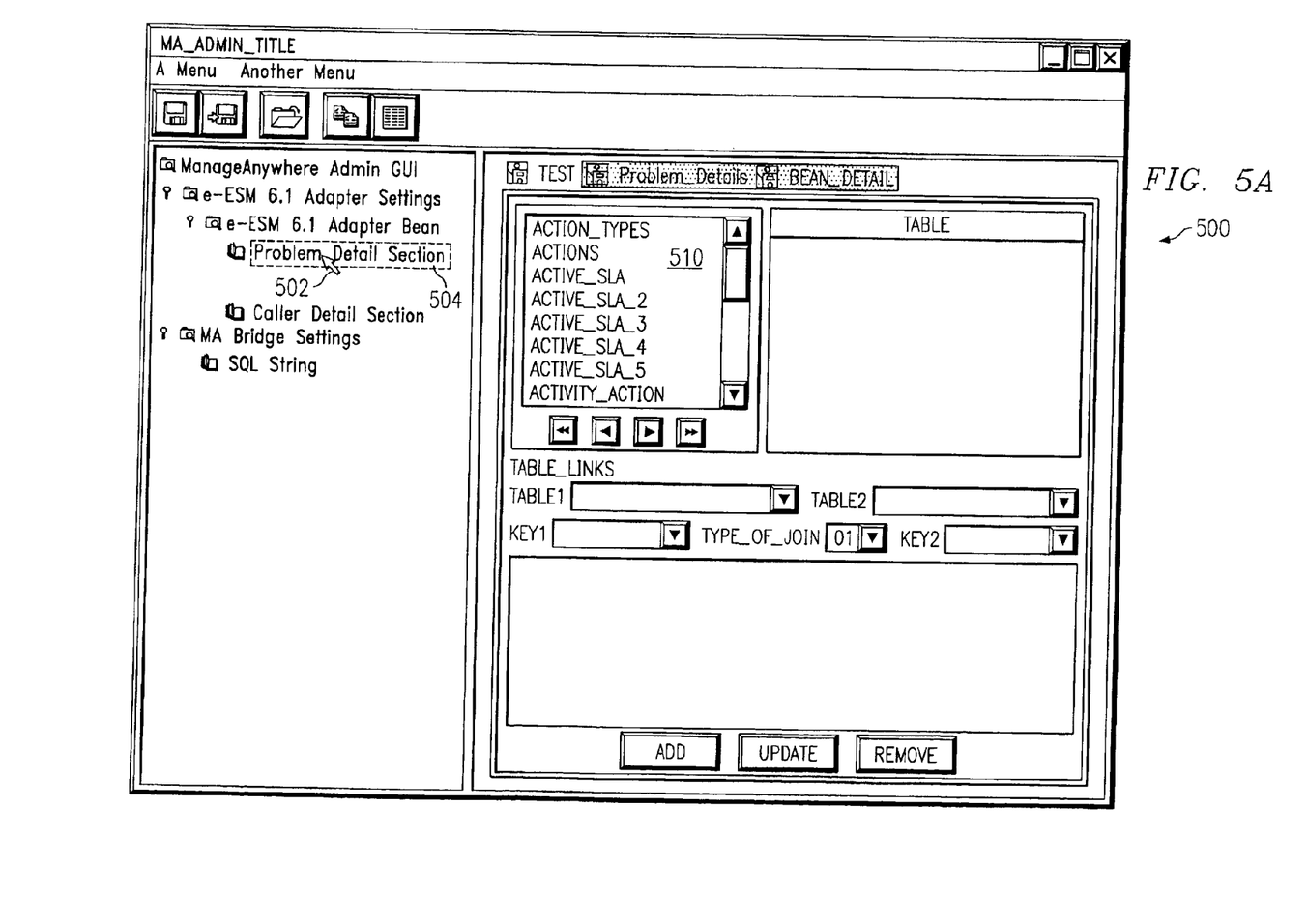
FIG. 5A depicts an exemplary graphical user interface showing available tables.

FIG. 5A depicts the graphical user interface (GUI) 500 for implementing client program 400. GUI 500 is provided by way of example and is not intended to limit the application of the invention to any other graphical user interface. The user has placed cursor arrow (502) onto "Problem Detail Section" 504 and upon clicking on the "Problem Detail Section" has received a display in table display 510 showing an alphabetical listing of available tables.

Figure 5B:
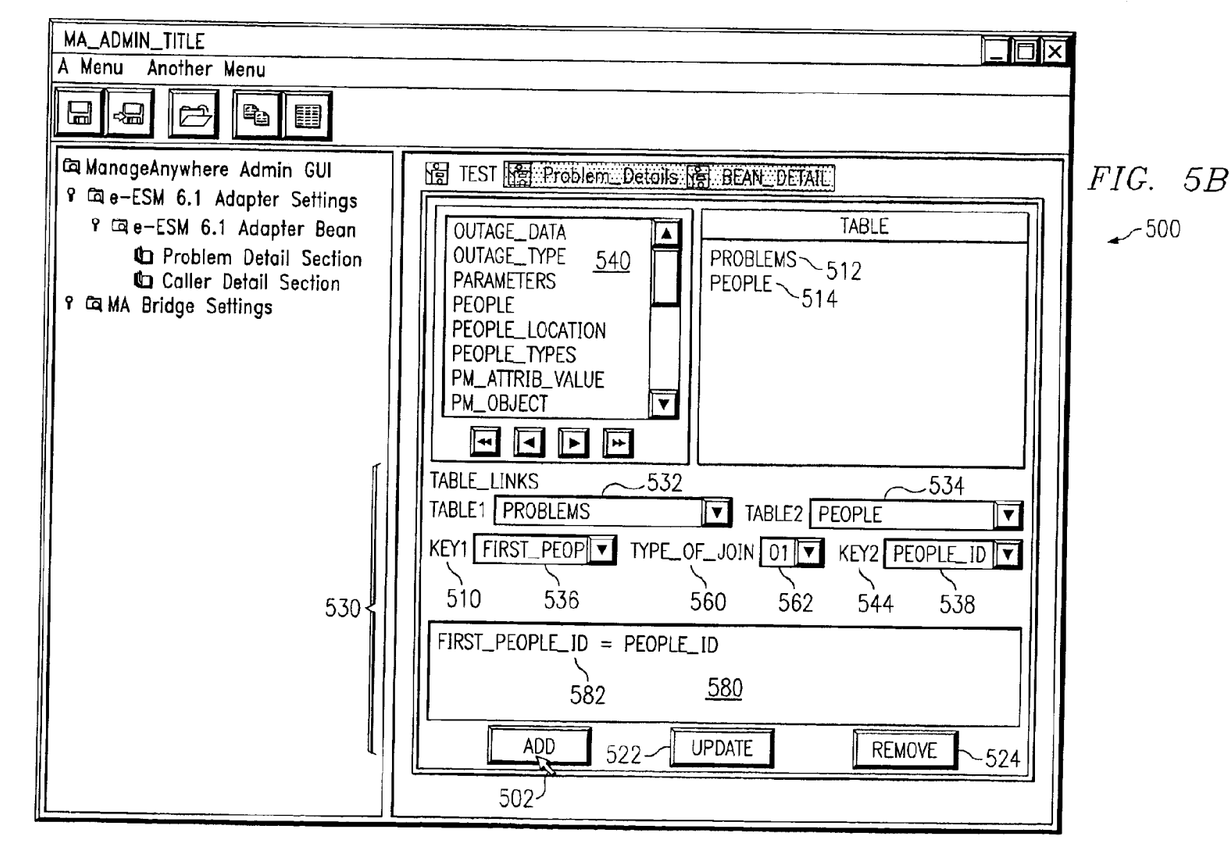
FIG. 5B depicts an exemplary graphical user interface showing joining of tables.

FIG. 5B depicts GUI 500 showing the user selection of two tables. The user has selected the "Problems" table (512) and the "People" table (514) from table display (See FIG. 5A). Table links section (530) of (GUI 500 shows the "Problems" table selected in Table 1 window (532) and the "People" table selected in Table 2 window (534). Key 1 window (510) shows FIRST_PEOPLE_ID (536). Key 2 window (544) shows PEOPLE_ID (538). Type_of_Join window (560) shows 1:1 (562). The user has placed cursor arrow 502 onto the ADD button and clicked the ADD button. Table links display section 580 shows FIRST_PEOPLE_ID=PEOPLE_ID (582). The user may also select update button 522 or remove button 524.

Figure 5C:
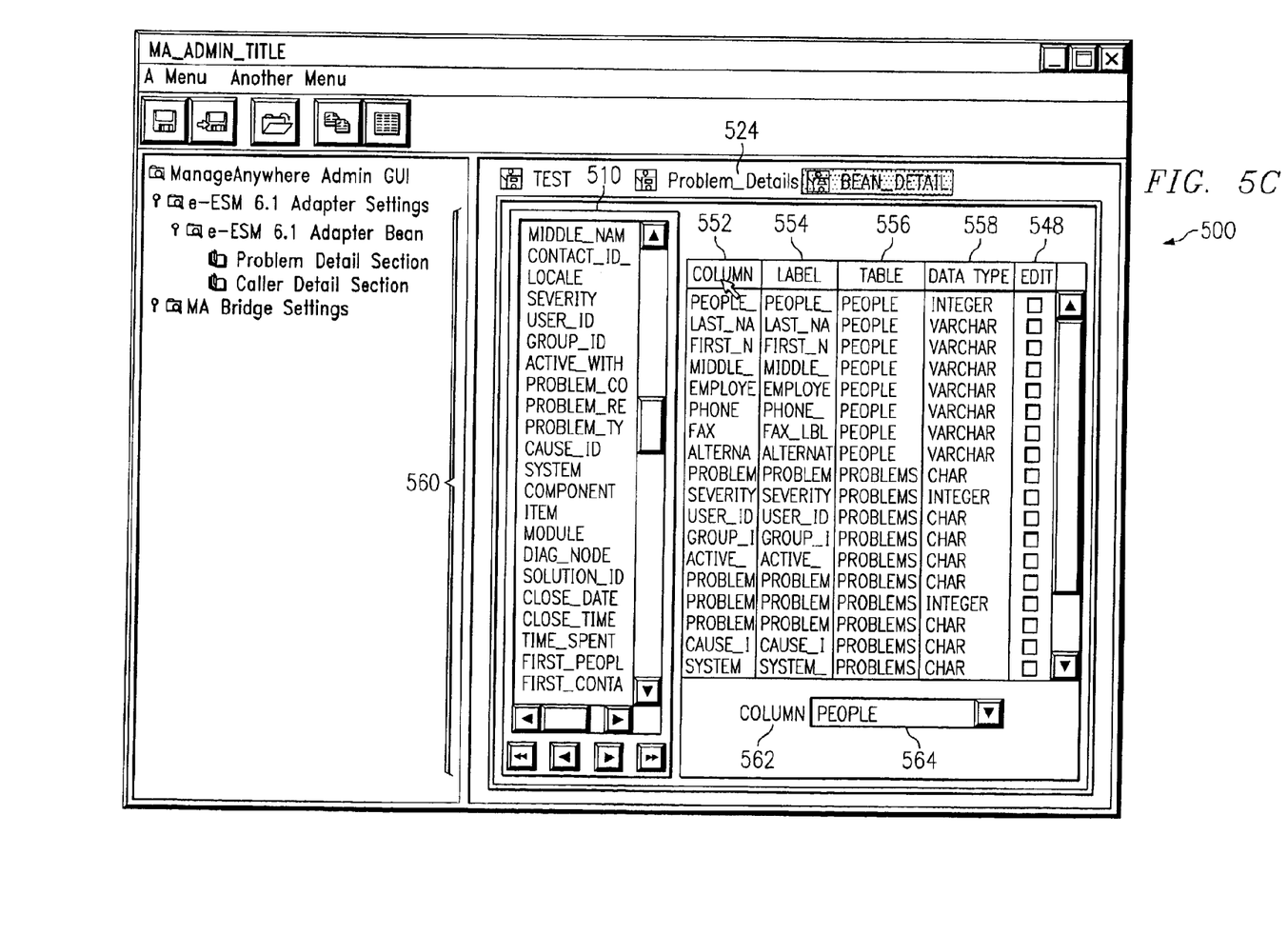
FIG. 5C depicts an exemplary graphical user interface showing selection of columns.

FIG. 5C depicts GUI 500 where the user has selected Problem Details Section 524. Problem Details display area 560 shows all of the columns in the joined "People" and "Problems" tables. The user has placed cursor arrow 502 on the PEOPLE_ID Column and clicked the selection so that PEOPLE_ID 562 appears in Column Window 564.

Figure 5D:
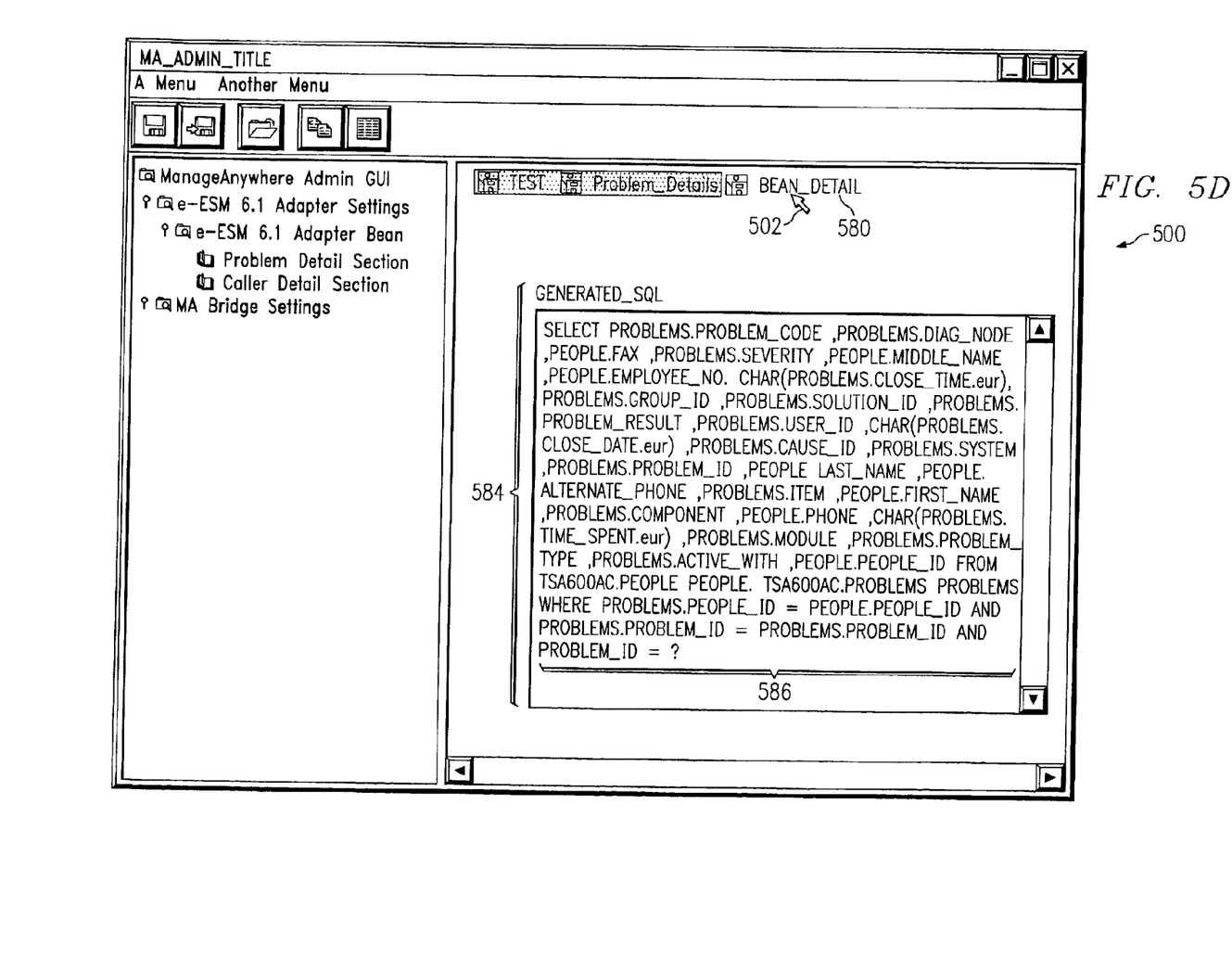
FIG. 5D depicts an exemplary graphical user interface showing SQL generation.

FIG. 5D depicts GUI 500 where the user has placed cursor 502 onto BEAN DETAIL tab 580 and clicked on BEAN DETAIL tab 580. The SQL statement (586) generated by the program bean is shown in bean detail window (584).

Figure 5E:
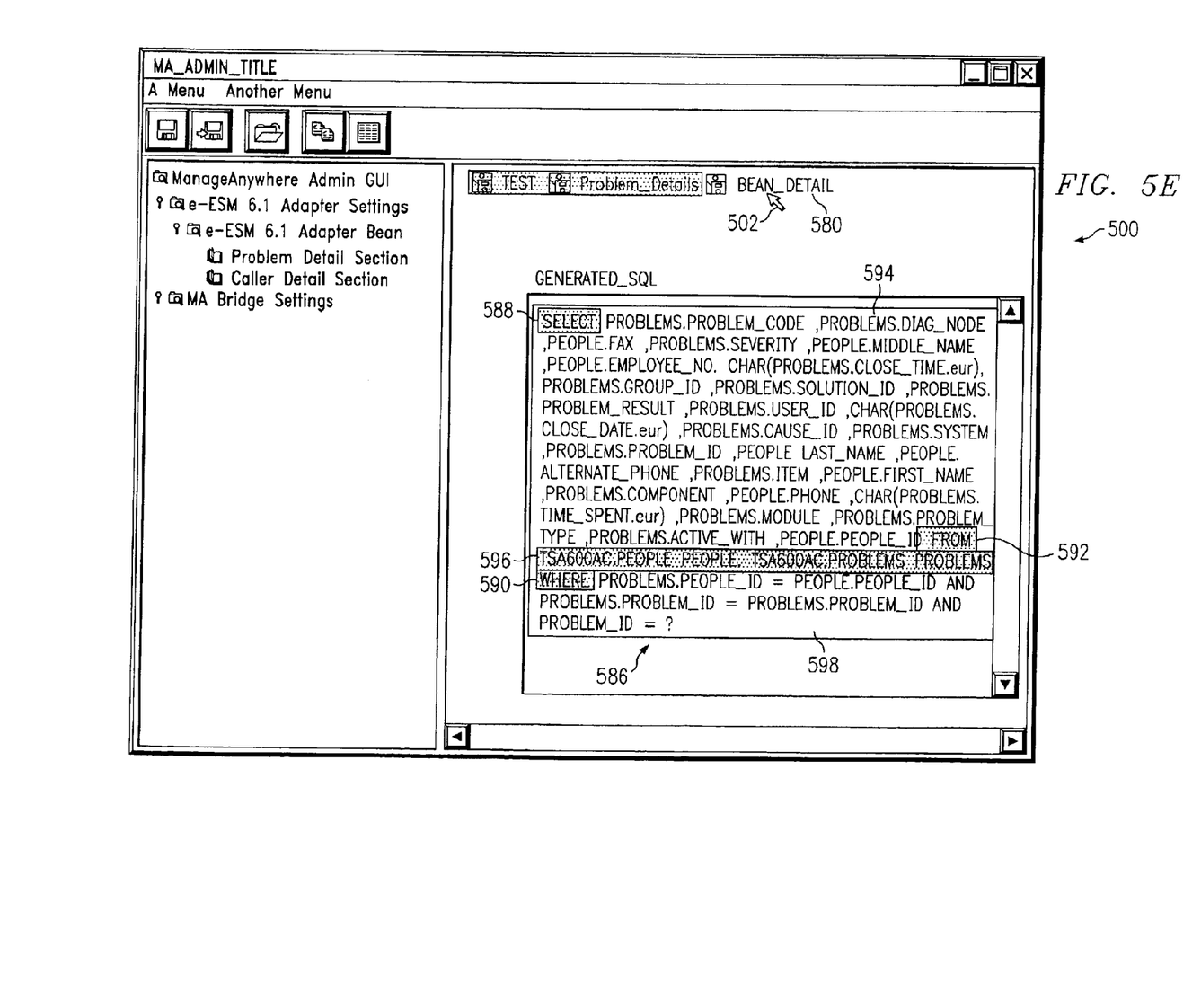
FIG. 5E depicts an exemplary SQL statement generated by the invention.

FIG. 5E depicts SQL statement 592 having first common element SELECT 588, second common element FROM 592 and third common element WHERE 590. First information element 594, second information element 596 and third information element 598 are supplied from the previous selections made by the user.

Figure 6:
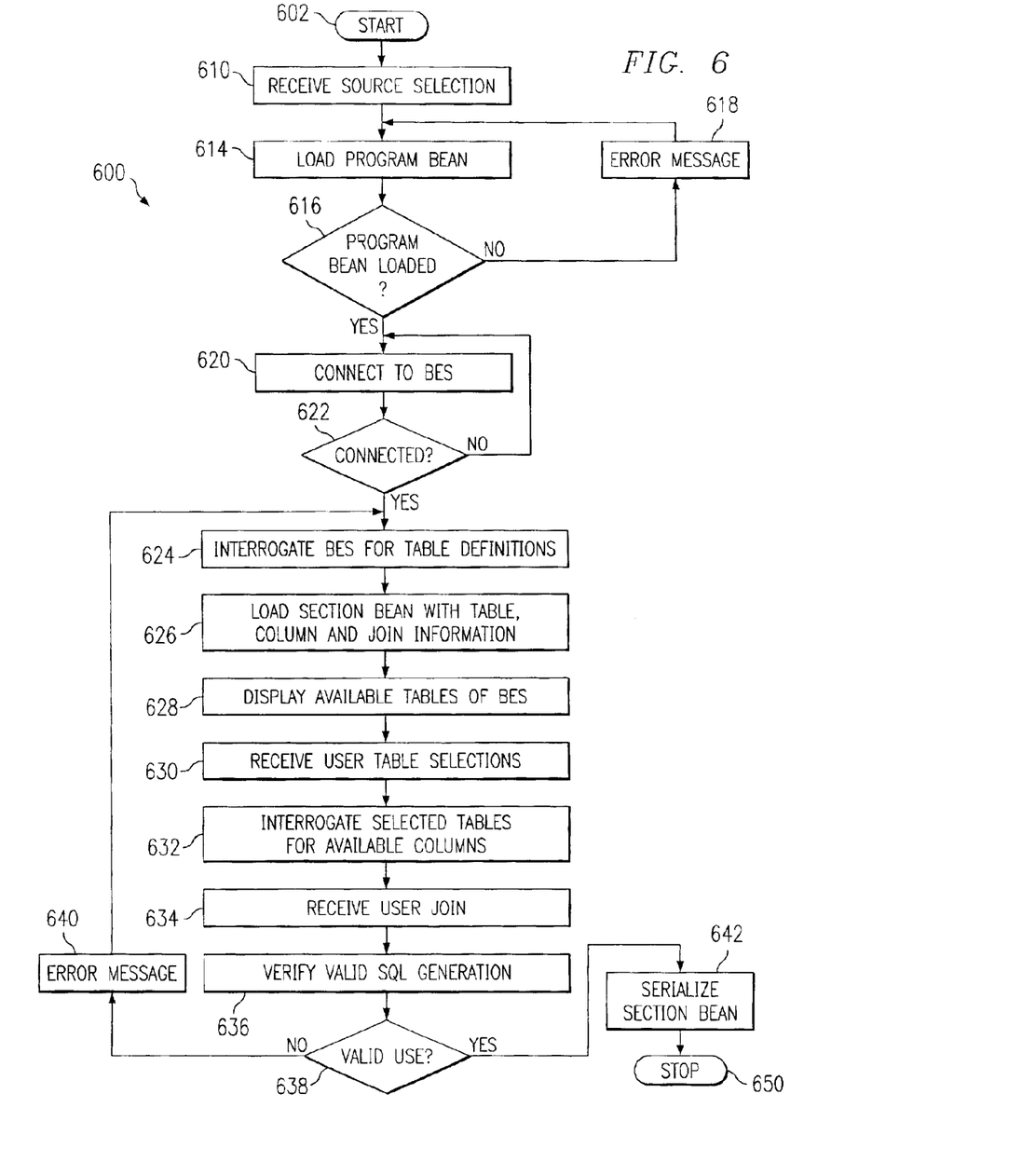
FIG. 6 is a flowchart showing the server program.

FIG. 6 is a flow chart of the Configuration Application at the server computer. Configuration Utility 600 starts (602). Configuration Utility 600 receives a source selection from the user (610). Configuration Utility 600 calls for the Program Bean for the selected source to be loaded (614). A determination is made as to whether the Program Bean is loaded (616). If the program bean is not loaded an error message is sent to the client (618) and Configuration Utility 600 returns to step 614. If the Program Bean is loaded, Configuration Utility 600 connects to Back End Storage (BES) (620). A determination is made as to whether the connection to BES is made (622). If the connection to BES is not made, Configuration Application 600 returns to step 620. If the connection to BES is made, Configuration Application 600 interrogates BES for table definitions (624). The SectionBean for the running application is loaded with table, column and join information. (626). Configuration Application 600 displays the available table of the BES for the user (628). Configuration Application 600 receives user table selections (630). The selected tables are interrogated for available columns (632). Join information is received from the user (634). Configuration Application 600 verifies valid SQL generation (636). A determination is made as to whether the user has made valid selections (638). If the user has not made valid selections, an error message is displayed (640) and Configuration Application 600 returns to step 624. If the user has made valid selections, the SectionBean is serialized (642) and Configuration Application 600 ends (650).

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A computer implemented process to return a custom field from a back end storage comprising:
   at a client computer, using a graphical user interface to provide a user input;
   at a server computer, responsive to receiving the user input at a configuration application, generating a structured query language statement and storing the structured query language statement in a section bean, serializing the section bean, and responsive to receiving a request for the custom field from a web-based application, loading a program bean containing the serialized section bean and returning the custom field to the web-based application so that the custom field is returned without stopping the web-based application to access a property file or to write a code for the structured query language statement.

2. The computer implemented process of claim 1 further comprising:
   in the section bean, storing a plurality of components to create a valid structured query language statement.

3. The computer implemented process of claim 2 wherein the plurality of components further comprises a column information, a table information, a filter information, a table joining information, and a plurality of methods to generate a structured query language statement.

4. The computer implemented process of claim 1 wherein the program bean contains methods to get the section bean and to use the section bean to return a valid structured query language statement.

5. The computer implemented process of claim 1 wherein the configuration application uses a bean configuration utility to create a new section bean.

6. The computer implemented process of claim 1 wherein the configuration application uses a bean configuration utility to configure an existing section bean running on a server.

7. The computer implemented process of claim 1 wherein the configuration program uses a bean configuration utility to configure an existing section bean stored to a file system.

8. The computer implemented process of claim 1 further comprising, using the configuration application, connecting to the back end storage and interrogating the back end storage for a table definition.

9. The computer implemented process of claim 1 further comprising, using the configuration application, loading the section bean with a table column information and a join information.

10. The computer implemented process of claim 1 further comprising, using the configuration application, displaying an available table of the back end storage for the user.

11. The computer implemented process of claim 1 further comprising, using the configuration application, receiving a user table selection.

12. The computer implemented process of claim 1 further comprising, using the configuration application, interrogating a selected table for a column.

13. The computer implemented process of claim 1 wherein the step of serializing the bean is performed responsive to determining that the user has made a valid selection.

14. The computer implemented process of claim 1 further comprising, using the graphical user interface, selecting a table, joining a table, selecting a column, reviewing a conditional structured query language statement, determining if the structured query language statement is valid, and responsive to determining that the structured query language statement is valid, saving the structured query language statement.

15. A programmable apparatus for developing structured query language statements to re-configure a program while the program is running comprising:
   programmable hardware comprising:
      a server computer;
      a client computer;
      a relational data base;
      a network connecting the server computer, the relational data base, and the client computer;
      a configuration application installed on the server computer;
      a graphical user interface in the configuration program accessible by a user at the client computer;
   wherein the configuration application further comprises instructions to cause the server computer to, responsive to receiving a user input at the configuration application, generate a structured query language statement, store the structured query language statement in a section bean, serialize the section bean, responsive to receiving a request for the custom field from the web-based application, load a program bean containing the serialized section bean, and return the custom field to the web-based application so that the custom field is returned without stopping the web-based application to access a property file or to write a code for the structured query language statement.

16. The programmable apparatus of claim 15 wherein the configuration application further comprises instructions to, using the graphical user interface, select a table, join a table, select a column, review a conditional structured query language statement, determine if the structured query language statement is valid, and responsive to determining that the structured query language statement is valid, save the structured query language statement.

17. A computer readable memory for developing structured query language statements to re-configure a web-based program while the program is running comprising:
   a server computer readable storage medium;
   a computer program stored in said storage medium;
   wherein the storage medium, so configured by said computer program, contains instructions for, responsive to receiving a user input at a configuration application, generating a structured query language statement and storing the structured query language statement in a section bean, serializing the section bean, and responsive to receiving a request for a custom field from a web-based application, loading a program bean containing the serialized section bean and returning the custom field to the web-based application.

18. The computer readable memory of claim 16 further comprising instructions to display a graphical user interface, and responsive to receiving a user input from the graphical user interface, select a table, join a table, select a column, and save a structured query language statement.

19. A computer program product on a computer-readable medium for returning a custom field from a back end storage comprising:
   at a server computer, means for receiving a user input; and
   responsive to receiving the user input, means for generating a structured query language statement;
   means for storing the structured query language statement in a section bean;
   means for serializing the section bean;
   responsive to receiving a request for the custom field from the web-based application, means for loading a program bean containing the serialized section bean; and
   means for returning the custom field to the web-based application so that the custom field is returned without stopping the web-based application to access a property file or to write a code for the structured query language statement.

20. The computer program product of claim 19 further comprising:
   means for selecting a table;
   means for joining a table;
   means for selecting a column;
   means for reviewing a conditional structured query language statement;
   means for determining if the structured query language statement is valid, and responsive to determining that the structured query language statement is valid; and
   means for saving the structured query language statement.

* * * * *